US010719063B2

(12) United States Patent
Rusakov

(10) Patent No.: US 10,719,063 B2
(45) Date of Patent: Jul. 21, 2020

(54) REAL-TIME EQUIPMENT CONTROL

(71) Applicant: Microsoft Technology Licensing, LLC, Redmond, WA (US)

(72) Inventor: Sergey Rusakov, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 255 days.

(21) Appl. No.: 15/287,172

(22) Filed: Oct. 6, 2016

(65) Prior Publication Data

US 2018/0101143 A1 Apr. 12, 2018

(51) Int. Cl.
*G05B 19/4155* (2006.01)
*G05B 19/042* (2006.01)
*G06F 9/48* (2006.01)

(52) U.S. Cl.
CPC ....... *G05B 19/4155* (2013.01); *G05B 19/042* (2013.01); *G05B 19/0421* (2013.01); *G05B 19/0425* (2013.01); *G06F 9/4887* (2013.01); *G05B 2219/25342* (2013.01); *G05B 2219/34403* (2013.01)

(58) Field of Classification Search
None
See application file for complete search history.

(56) References Cited

U.S. PATENT DOCUMENTS

| | | | | |
|---|---|---|---|---|
| 4,969,147 A * | 11/1990 | Markkula, Jr. | .... | G05B 19/0421 370/400 |
| 5,903,752 A | 5/1999 | Dingwall et al. | | |
| 5,995,745 A | 11/1999 | Yodaiken | | |
| 7,657,890 B2 * | 2/2010 | Kanai | ................. | G06F 9/45533 711/100 |
| 7,860,828 B2 * | 12/2010 | Kast | .................... | G06F 11/2097 707/610 |
| 8,861,434 B2 | 10/2014 | Khawer et al. | | |
| 9,056,555 B1 * | 6/2015 | Zhou | ................... | B60L 11/1827 |
| 9,286,137 B2 | 3/2016 | Betts et al. | | |
| 9,501,324 B2 * | 11/2016 | Munz | ..................... | G06F 9/4887 |
| 2002/0099756 A1 * | 7/2002 | Catthoor | ............ | G06F 17/5045 718/102 |

(Continued)

OTHER PUBLICATIONS

Underwood, Daron, "The Power and Value of a Converged Real-Time, Deterministic Platform", Published on: Apr. 2014, 4 pages. http://www.rtcmagazine.com/articles/view/103576.

(Continued)

*Primary Examiner* — Jason D Mitchell
(74) *Attorney, Agent, or Firm* — International IP Law Group, PLLC

(57) ABSTRACT

In one example, a system for real-time execution in a non-real-time processing system includes a processor and a processor and storage device. The storage device stores instructions that, in response to execution by the processor, cause the processor to identify a processing unit for a single thread real-time execution environment. The instructions also cause the processor to determine that an application is submitted for real-time execution. The instructions additionally cause the processor to assign a shared memory space to the application. Further, the instructions cause the processor to submit real-time instructions received from a real-time control loop of the application to the identified processing unit.

21 Claims, 11 Drawing Sheets

(56) References Cited

U.S. PATENT DOCUMENTS

| | | | | |
|---|---|---|---|---|
| 2005/0177819 | A1* | 8/2005 | Ober | G06F 9/3824 717/128 |
| 2005/0209061 | A1* | 9/2005 | Crawford | A63B 22/0056 482/54 |
| 2007/0083871 | A1* | 4/2007 | McKenney | G06F 9/4887 718/105 |
| 2007/0205576 | A1* | 9/2007 | Lynch | B62K 5/02 280/282 |
| 2008/0302626 | A1* | 12/2008 | Rossi | B27G 19/003 192/129 A |
| 2009/0038258 | A1* | 2/2009 | Pivac | B25J 5/00 52/749.14 |
| 2009/0132057 | A1* | 5/2009 | Kettu | B25J 9/161 700/5 |
| 2009/0210069 | A1* | 8/2009 | Schultz | G05B 19/05 700/7 |
| 2009/0210070 | A1* | 8/2009 | Schultz | G05B 19/05 700/7 |
| 2009/0328055 | A1* | 12/2009 | Bose | G06F 1/3203 718/105 |
| 2010/0287556 | A1* | 11/2010 | Munz | G06F 9/4887 718/102 |
| 2013/0204407 | A1* | 8/2013 | Chalapuradudi Bandigowda | G05B 11/01 700/83 |
| 2013/0233044 | A1* | 9/2013 | Arth | G05B 9/03 73/1.01 |
| 2015/0168936 | A1* | 6/2015 | Martinez Canedo | G06F 9/4887 700/20 |
| 2015/0186184 | A1* | 7/2015 | Kim | G06F 9/5088 718/104 |
| 2015/0278133 | A1* | 10/2015 | Subramanian | G06F 13/28 710/308 |
| 2016/0041941 | A1* | 2/2016 | Kessler | G06F 1/266 700/3 |
| 2016/0062331 | A1* | 3/2016 | Von Wendorff | G05B 19/042 702/66 |
| 2016/0080451 | A1* | 3/2016 | Morton | H04L 67/025 709/219 |
| 2016/0202673 | A1* | 7/2016 | Ehtemam-Haghighi | G06F 1/3287 700/275 |
| 2016/0283272 | A1* | 9/2016 | Coleman | G06F 9/5016 |

OTHER PUBLICATIONS

Aalto, Aleksi, "Dynamic management of multiple operating systems in an embedded multi-core environment", in Master's Thesis, May, 7, 2010, 80 pages.

"The Benefits of Multiple CPU Cores in Mobile Devices", in Whitepaper of Nvidia, Mar. 27, 2014, pp. 1-23.

Ault, Chris, "Delivering new functionality for graphics or networking", Published on: Aug. 10, 2011, 4 pages. http://www.embeddedintel.com/technology_applications.php?article=1832.

Fischer, Paul, "Embedded Virtual Manager on Multi-Core Solves Legacy RTOS Problems", Published on: Oct. 9, 2008, 4 pages. http://eecatalog.com/multicore/2008/10/09/embedded-virtual-manager-on-multi-core-solves-legacy-rtos-problems/.

"Multicore Real-Time Operating system (RTOS)", Retrieved on: Aug. 2, 2016, 1 page. http://demo.rowebots.com/embedded_and_dsp_education/multicore_rtos.

Christofferson, Michael, "Improve Real-Time Linux Behavior on Embedded Multicore Devices", Published on: Dec. 27, 2012, 4 pages. http://www.embeddedintel.com/special_features.php?article=2618.

"Real-Time Linux", Published on: Jun. 23, 2014, 8 pages. http://www.wiki.xilinx.com/Real-Time+Linux.

* cited by examiner

300

700

REAL-TIME EQUIPMENT CONTROL

BACKGROUND

Real-time equipment control is useful for developers of software applications that control the equipment because there are times when valuable resources may be at risk if the equipment cannot be operated in real-time. Operating in real-time means that when a software application instructs the equipment to take an action, the action is taken in as close to real-time as possible, without preemption. Thus, the software application can include, for example, an emergency stop command that stops the equipment in real-time. Accordingly, if a robot controlled by such software is swinging a heavy instrument in the direction of a person, the robot can be stopped in real-time by the emergency stop command, eliminating the risk of harm.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

An embodiment described herein includes a system for real-time control using a non-real-time operating system. The system for real-time execution in a non-real-time processing system includes a processor and a storage device. The storage device stores instructions that, in response to execution by the processor, cause the processor to identify a processing unit for a single thread real-time execution environment. The instructions also cause the processor to determine that an application is submitted for real-time execution. The instructions additionally cause the processor to assign a shared memory space to the application. Further, the instructions cause the processor to submit real-time instructions received from a real-time control loop of the application to the identified processing unit.

Another embodiment described herein includes a method for real-time control of equipment using a non-real-time operating system. The method includes identifying a first core of a first processing unit to single thread real-time execution. The method includes identifying a second core of a second processing unit for single thread real-time execution. The first core and the second core are identified based on whether identification numbers for the first core and the second core are highest-numbered cores in comparison to other cores of the first processor and the second processor. The method also includes determining that an application is submitted for real-time execution. The method additionally includes assigning a shared memory space to the application. Further, the method includes submitting instructions received from a real-time control loop of the application to the identified first core of the first processing unit.

In yet another embodiment described herein, one or more computer-readable storage devices for real-time execution include instructions that, based at least on execution by a plurality of processing units, cause the processors to identify a specified number of cores associated with the processing units for a single thread real-time execution environment. The instructions also cause the processing units to determine that an application is submitted for real-time execution. The instructions further cause the processing units to assign a shared memory space to the application. Additionally, the instructions cause the processing units to submit real-time instructions received from the real-time control loop of the application to one of the identified cores.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

The following detailed description may be better understood by referencing the accompanying drawings, which contain specific examples of numerous features of the disclosed subject matter.

DETAILED DESCRIPTION

Figure 1:
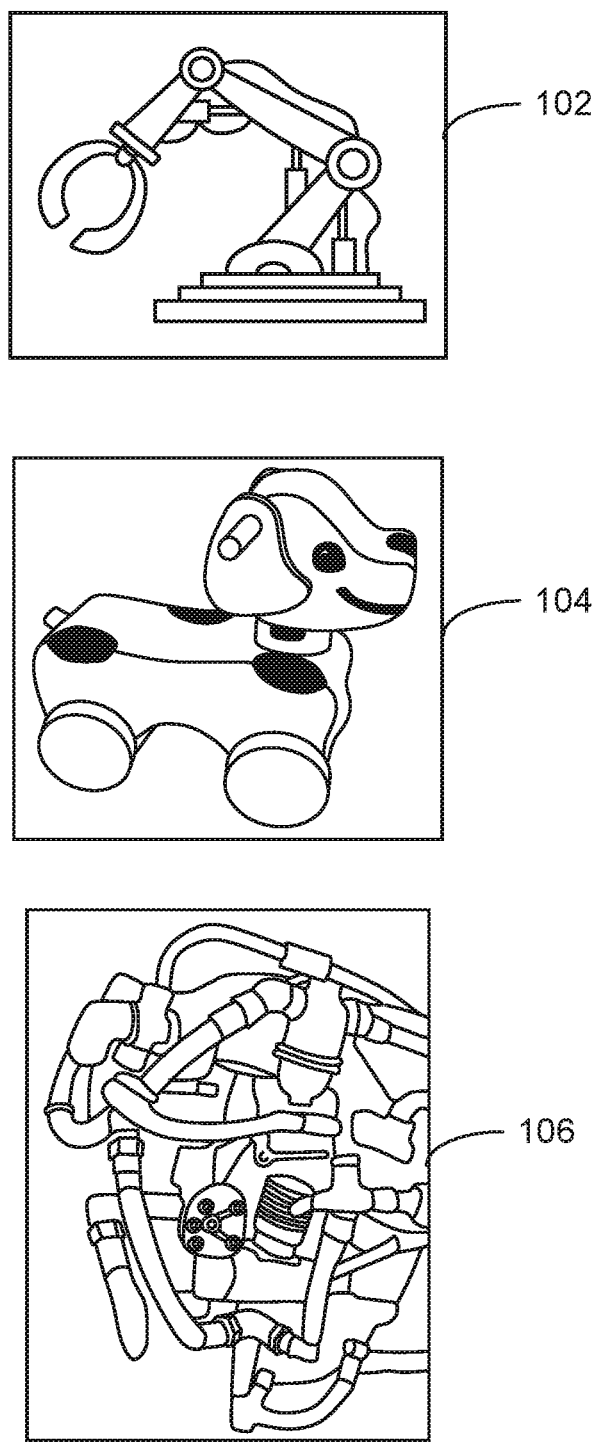
FIG. 1 is a diagram of example equipment that may be operated in real-time by a non-real-time operating system.

This equipment discussed previously is typically controlled by an electronic control unit (ECU). The ECU is a computing device that sends the specific commands that make the equipment perform various operations. Real-time operation is useful for various types of equipment run by computing devices, where the equipment has specific timing requirements and critical failure paths. Timing requirements are parameters that specify how much time a piece of equipment has to perform particular actions. Critical failure paths refer to scenarios where the equipment may be subject to failure if the equipment does not take some action in real-time. For example, equipment parts can jam or break. Sensors used to provide context for operating the equipment may get stuck or miss data. Further, some equipment includes closed loop controls which do not function correctly if the software running the equipment does not react to new data in real-time.

Typically, software applications issue commands to make the equipment take specific actions. However, software applications run in coordination with an operating system. The operating system is software that serves as an intermediary between the software applications and the hardware of the computing device, such as the cores. Yet, if the operating system is not capable of real-time operation, the operating system may pre-empt any commands issued by the software application, causing a delay in the response of the equipment to the command, thereby preventing the software application from operating the equipment in real-time.

One approach to real-time equipment control with a non-real-time operating system is to use a microcontroller connected directly to the equipment. In this approach, the microcontroller is responsible for real-time operations, and the software application is responsible for operations without real-time specifications. Typically, a microcontroller used for real-time control of equipment is a 16-bit computing device with limited computational ability, and runs at around 20 MHz clock speed. In contrast, one example implementation of the claimed subject matter uses a 32 or 64-bit processor core running at 1200 MHz processor, therefore offering significantly more computing power and speed, and providing the ability to control equipment that a microcontroller cannot. Further, the installation of a microcontroller adds to the cost of operating the equipment. Alternatively, a real-time operating system (RTOS) from a third party may be installed on the computing device. However, adding an additional operating system is an expensive solution because it incurs the costs of installing and licensing the RTOS.

However, embodiments of the claimed subject matter provide real-time control capability inside a non-real-time operating system. Such a non-real-time operating system is configured to dedicate one core (CPU) to real-time functionality. In such an embodiment, the non-real-time operating system does not pre-empt the execution of the software application controlling the equipment, thus enabling real-time control.

Figure 10:
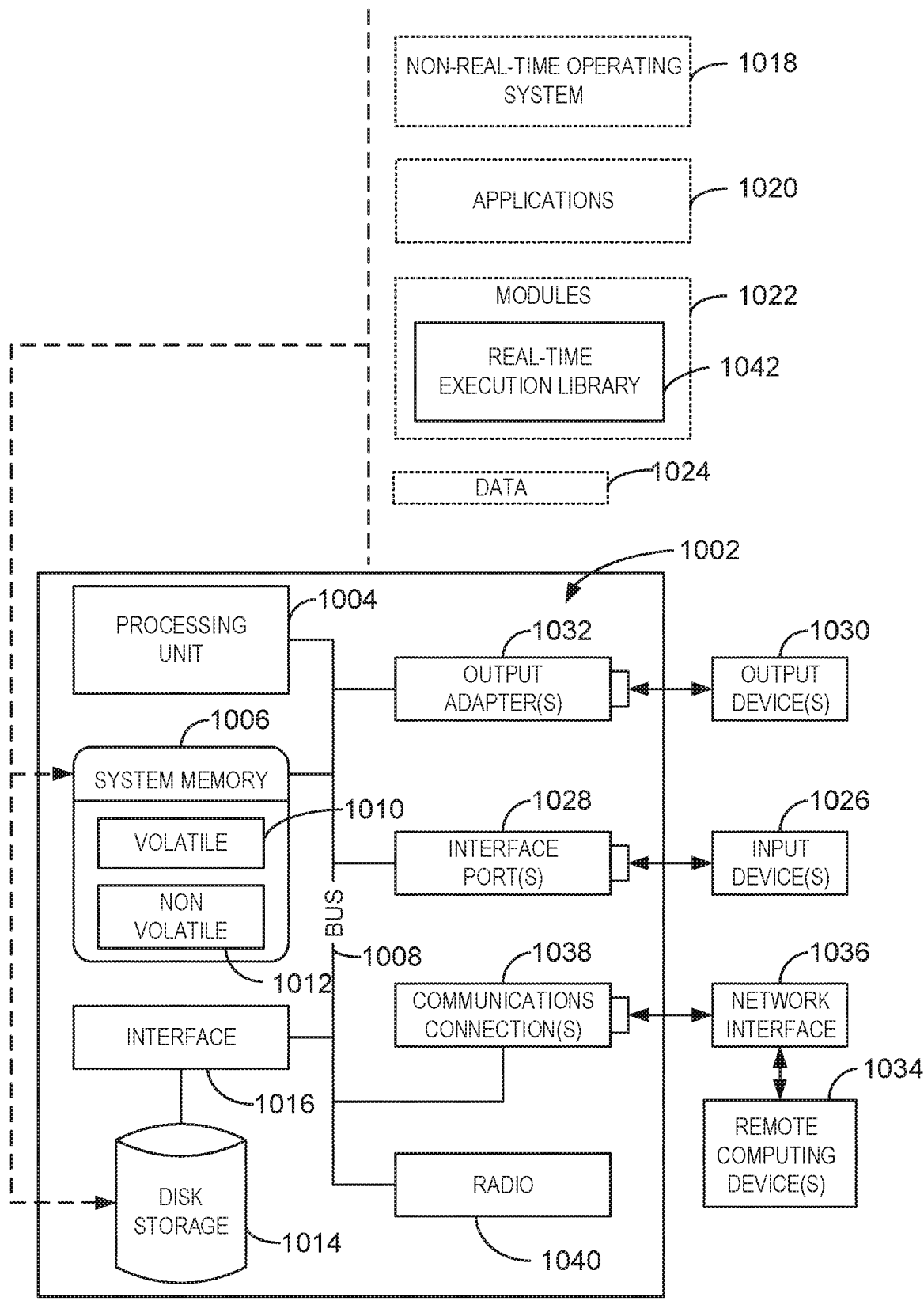
FIG. 10 is a block diagram of an example of a computing system.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 10, discussed below, provides details regarding different systems that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, and the like, or any combination of these implementations. As used herein, hardware may include computer systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like.

FIG. 1 is a diagram of example equipment that may be operated in real-time by a non-real-time operating system. Equipment operating in real-time with a non-real-time operating system can vary from household items to factory equipment. Some examples of such equipment include a robotic arm 102, a motorized puppy toy 104, and an engine 106. The robotic arm 102 is an example piece of equipment that may be operated in a factory setting. Operating the robotic arm 102 in real-time may enable safe operation of the robotic arm 102. The motorized puppy toy 104 is an example piece of equipment that may be operated in a home or daycare setting. Operating the motorized puppy toy 104 in real-time may provide reliable control of the toy. The engine 106 is another example piece of equipment found in vehicles, lawnmowers, and so on. In engines, such as an internal combustion engine, the operation may be hindered if it cannot be operated in real-time. For example, the fuel and spark used for combustion have strict timing parameter. As such, if the timing of the spark and the provision of fuel do not meet the timing parameters, the engine 106 may be unable to provide combustion.

It is noted that these are merely example of equipment that may be operated in real-time by a non-real-time operating system. Other examples are possible, including things in an Internet of things network. The term, Internet of Things means any networked collection of addressable embedded computing nodes. Such nodes are examples of computer systems as defined herein, but they also have at least two of the following characteristics: (a) no local human-readable display; (b) no local keyboard; (c) the primary source of input is sensors that track sources of non-linguistic data; (d) no local rotational disk storage—RAM chips or ROM chips provide the only local memory; (e) no CD or DVD drive; (f) embedment in a household appliance; (g) embedment in an implanted medical device; (h) embedment in a vehicle; (i) embedment in a process automation control system; or (j) a design focused on one of the following: environmental monitoring, civic infrastructure monitoring, industrial equipment monitoring, energy usage monitoring, human or animal health monitoring, or physical transportation system monitoring.

For example, a piece of equipment may be configured as a device includable in the Internet of things, such as light bulbs, locks, cars, kitchen appliances, and so on. Such devices may be low-resource devices, e.g., with limited memory or processing resources (e.g., thermostats, locks, and so forth).

Figure 2:
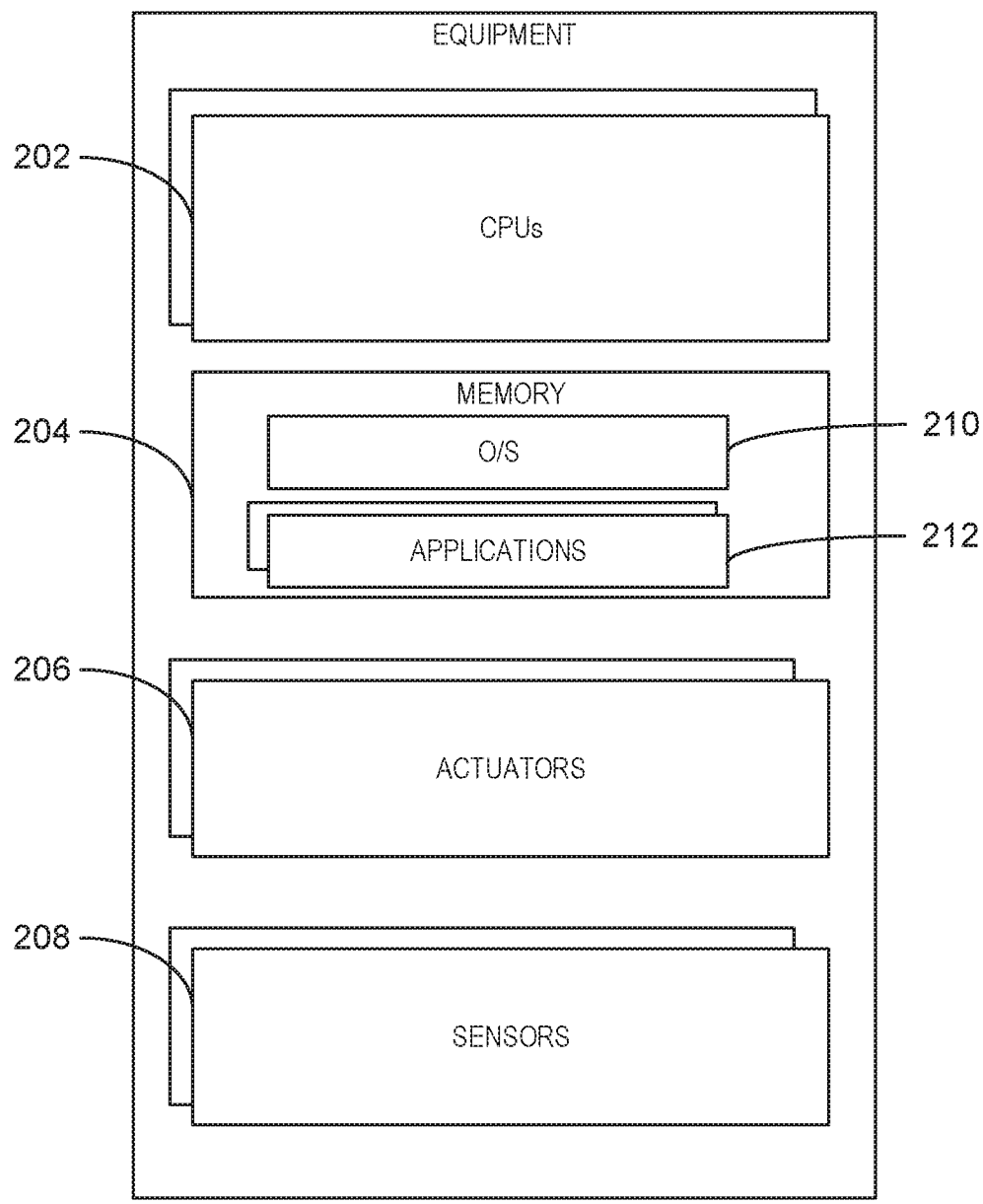
FIG. 2 is a block diagram of example equipment that may be operated in real-time by a non-real-time operating system.

FIG. 2 is a block diagram of example equipment 200 that may be operated in real-time by a non-real-time operating system. The equipment 200 includes multiple computer processing units (CPUs) 202, memory 204, actuators 206, and sensors 208. The CPUs 202 are processors that execute instructions that operate the equipment. The CPUs are also referred to herein as cores. The memory 204 is a computer memory, such as a read-access memory (RAM), or a read-only memory (ROM) device.

The actuators 206 are devices capable of receiving commands represented as electronic signals, and taking specific actions in response to the commands. Types of actuators 206 include the mechanical, electric, hydraulic (energy applied by fluid), pneumatic (energy applied by vacuum), magnetic, thermal, and the like. Examples of such actuators 206 include a rack and pinion (mechanical), a spark plug (electrical), a cylinder motor (hydraulic), a pneumatic tube system, a solenoid (magnetic), and a shape-memory alloy (thermal).

The sensors 208 are devices that detect specific characteristics of an environment and provide those characteristics as an output. Examples of sensors include temperature sensors, motion sensors, light sensors, cameras, Geiger counters, and so on.

The memory 204 includes an operating system 210, and one or more applications 212. The applications 212 may be software programs that perform the processes for operating the equipment, potentially using information from a user interface (not shown) and sensors 208. One example of an application 212 is a home security application that collects information from motion sensors, and sends a command to sound an alarm device if motion is detected in a room that is supposed to be empty.

The operating system 210 is software that manages use of the CPUs 202 and memory 204, and enables the applications 212 to execute their instructions on the CPUs 202. More specifically, the applications 212 make requests of the operating system 210 by providing instructions for the CPUs 202 to execute. The operating system 210 may perform certain checks to ensure the application 212 is authorized to have these instructions executed. If the application 212 is authorized, the operating system 210 sends the instructions to the CPUs 202. In turn, the CPUs 202 send commands, generated by the executed instructions, to the actuators 206, which cause the equipment 200 to operate according to the command.

Further, the applications 212 may run in one of two modes: user mode or kernel mode. The kernel mode provides a higher level of authorization than the user mode. When run in kernel mode, an application has the authority to perform any action on the CPUs 202 or memory 204. Typically, kernel mode is reserved for the operating system 210. However, when run in user mode, an application has limited authorization. Limiting authorization usually prevents user-level applications from creating avoidable conflicts, or causing fatal errors.

The instructions of the applications 212 manage the operations of the equipment 200. Managing operations of the equipment 200 means performing specific processes, and enforcing specific rules for operating the equipment 200. For example, an example application may operate a robotic arm, used to move boxes off from one conveyor belt to another. In this example, the application follows a process of specific operations of the robotic arm, and performs these operations in a loop. A loop is a set of computer program instructions that are repeated any number of times. In this example process, the robotic arm may perform the following process: 1) turn robotic arm towards the conveyor belt providing boxes; 2) extend the robotic arm towards a box; 3) grab and lift box; 4) turn robotic arm towards conveyor belt that takes away boxes; and 5) place box on conveyor belt. In such a scenario, this process is performed in a loop, i.e., repeatedly.

In a real-time operating system, instructions are passed to a CPU as they are received from the applications 212. In this way, even though multiple applications 212 are running at the same time, the applications 212 may execute in real-time. However, in examples of the claimed subject matter, the operating system 210 is a non-real-time operating system. Typically, in a non-real-time operating system, the operating system prioritizes requests from the various applications 212 running. As such, there may be times when a non-real-time operating system may pre-empt the execution of an instruction received from one application by allowing another application's instruction to execute first. In this way, the instructions are executed out of order from when received. Accordingly, the applications may not execute in real-time because there is a delay between when the instruction is sent to the operating system, and when the instruction is sent to the CPU. However, in examples of the claimed subject matter, the non-real-time operating system 210 may execute applications 212 in real-time.

Figure 3:
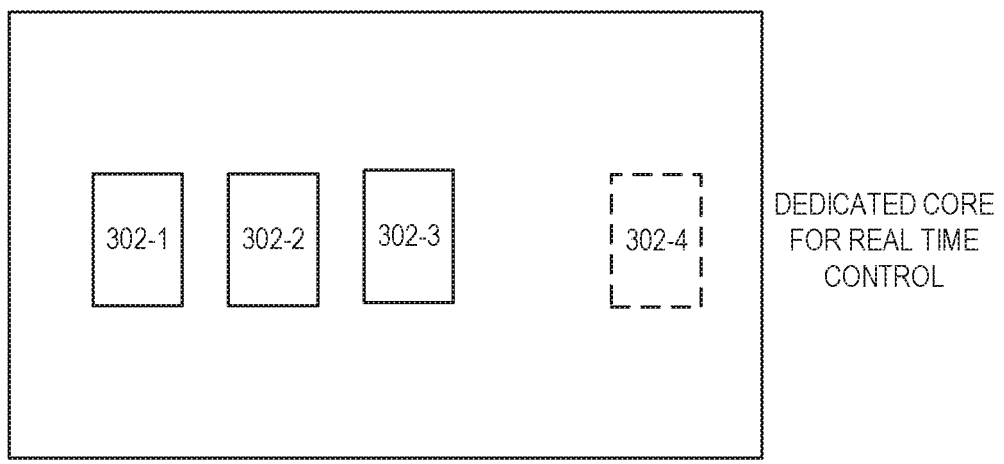
FIG. 3 is a block diagram of cores for an example piece of equipment.

FIG. 3 is a block diagram of cores for an example piece of equipment 300. As stated previously, equipment operating in real-time using a non-real-time operating system may include multiple cores 302-1, 302-2, 302-3, 302-4. In examples of the claimed subject matter, the non-real-time operating system uses one or more cores, e.g., cores 302-1, 302-2, 302-3 for instructions that do not have real-time requirements. Additionally, the non-real-time operating system dedicates one or more cores, e.g., core 302-4, to a single thread. Dedicating only one core to a single thread means that only one executing application 212 has access to the core 302-4 at any one time. In this way, the non-real-time operating system provides real-time control. It is noted that cores 302-1, 302-2, 302-3, 302-4 are merely one example of cores used by a non-real-time operating system in examples of the claimed subject matter. Other examples may include more or fewer cores. Further, the number of cores dedicated to real-time processing may be configurable, such that one thread may execute on one core at a time.

Figure 4:
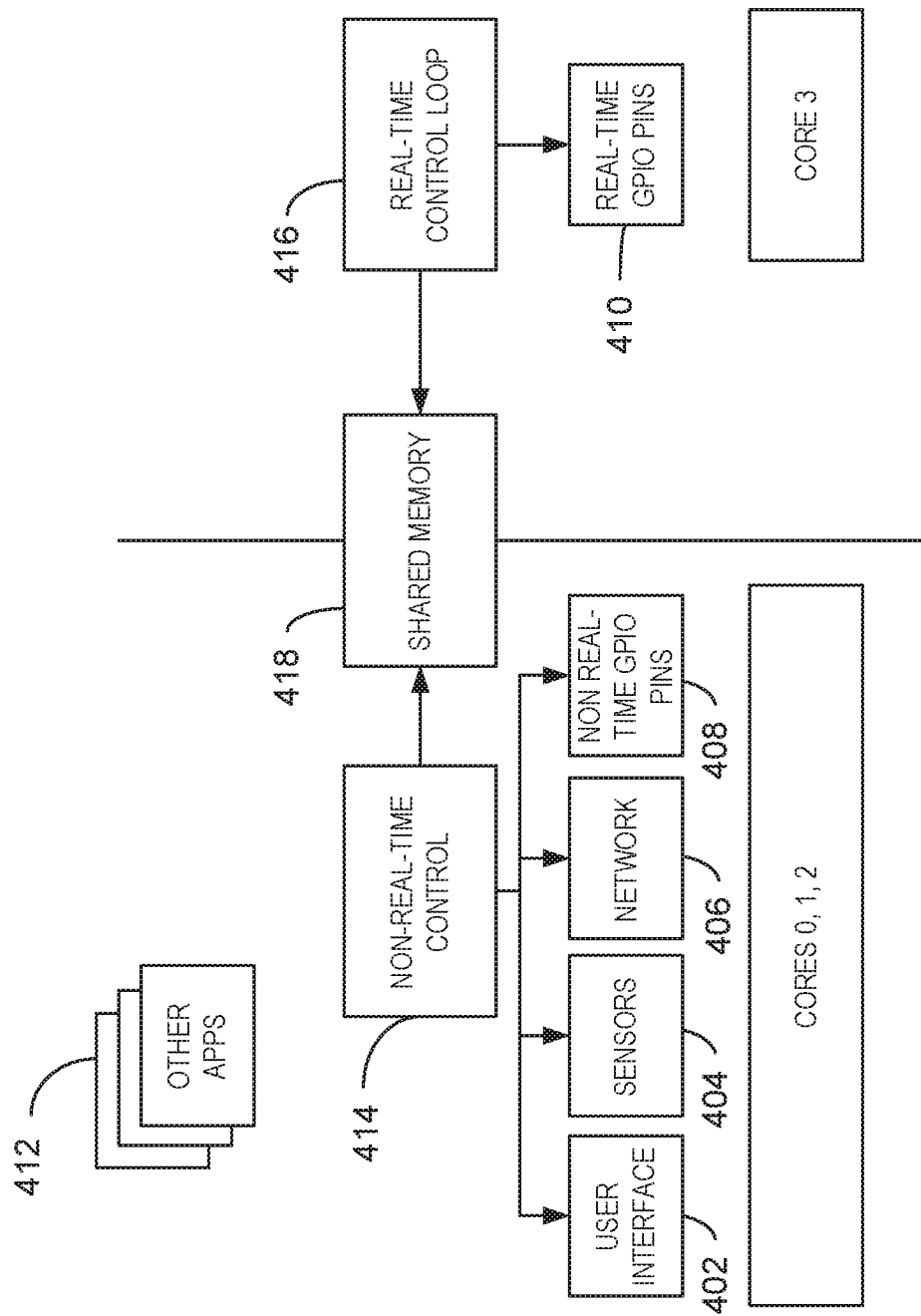
FIG. 4 is a block diagram of a split application architecture in a multi-core environment.

FIG. 4 is a block diagram of a split application architecture 400 in a multi-core environment. The architecture 400 includes cores 0, 1, 2 for non-real-time operations, core 3 for real-time operations, a user interface 402, sensors 404, a network 406, non-real-time general purpose input-output (GPIO) pins 408, and real-time GPIO pins 410. The user interface 402 is one or more controls for operating a piece of equipment. For example, a robotic arm may have a user interface that includes a joystick, several buttons, and a software application. By moving the joystick, a user may direct the robotic arm to extend, retract, and move in specific directions. Buttons may provide the user a way to have the robotic arm perform certain operations, such as grabbing and releasing objects. The software application may also direct operations, such as, powering the equipment on and off, and performing an emergency stop.

The sensors 404 provide information about the environment of the equipment. For example, sensors 404 may detect and provide information such as ambient temperature, temperature of the robotic arm, barometric pressure, the distance between the robotic arm and other people or objects in the vicinity of the robotic arm, and the like. Other sensors may detect images, sizes, weights of specific objects, and so on. With the information from the sensors, the equipment may be directed to respond to certain conditions. For example, if a distance sensor indicates someone is approaching a robotic arm in motion, the robotic arm may be directed to perform an emergency stop.

The network 406 may enable the equipment to communicate with remote devices for purposes, such as remote operation and communication. For example, a user at a remote location may connect to the equipment over the network 406, and operate the equipment remotely. Additionally, the network 406 may enable the equipment to provide relevant information to remote users. The information may include data analytics, for example, and may be provided via emails, instant messages, texts, and the like. For example, a message may be sent over the network 406 to a safety officer's mobile device whenever the equipment performs an emergency shut-down. The network 406 may also provide the equipment with a connection to network-based computing resources, such as software and firmware updates. With such resources, the equipment may be able to download new versions of software and firmware as they become available. Advantageously, the network 406 enables the equipment to be maintained and operated using current, not outdated, versions.

The non-real-time GPIO pins 408 provide an input interface whereby the application currently running may be fed inputs, and an output interface whereby the equipment may be directed to act. The non-real-time GPIO pins 408 may be conductive pins electrically connected with sensors 404 and actuators that provide information represented as electric signals to the non-real-time control 414 and actuators. Sample inputs to the non-real-time GPIO pins 408 may include the direction the joystick is pointing, and indications as to whether specific buttons have been pressed. Sample outputs may include operation commands, such as extend the robotic arm.

Similarly, the real-time GPIO pins 410 provide an input and output interface between the real-time control loop 416 and the sensors 404 and actuators. The real-time GPIO pins 410 are used for operations that are to take place in real-time. An example input may be an indication that the emergency stop button has been pressed. The output interface may provide commands for the equipment, such as perform an emergency shut-down.

The architecture 400 also includes a currently running application and other apps 412. The other apps 412 are software applications that may not be currently running. All of the applications in the architecture 400 may be split into two parts, a non-real-time control 414, and a real-time control loop 416. The real-time control 414 and control real-time control loop 416 may each be responsible for specific processes and resources. For example, the non-real-time control 414 handles general application logic and interaction with slower inputs, such as human users and low speed sensors. The non-real-time control 414 uses information from the user interface 402, sensors 404, network 406, and the pins 408 to operate the equipment for tasks without real-time requirements, such as sending data analytics to a gateway device. Providing data analytics may not have real-time requirements because typically such information is used for analysis. In examples of the claimed subject matter, the operating system (not shown) may execute the instructions of the non-real-time control 414 on any of cores 0, 1, 2.

The real-time control loop 416 is software that directs the equipment to perform repetitive operations, such as the robotic arm moving packages from one conveyor belt to another. Additionally, the real-time control loop 416 uses the real-time GPIO pins 410 to receive information relevant to operating the equipment in real-time. The real-time control loop 416 may also use the real-time GPIO pins 408 to provide commands for operations the equipment is to perform in real-time. In examples of the claimed subject matter, the operating system may execute the real-time control loop 416 on core 3, which is dedicated to a single thread of real-time execution.

The non-real-time control 414 and the real-time control loop 416 may communicate with each other using a shared memory 418. In this way, parameters for real-time operation may be passed from the real-time control 414 to the control real-time control loop 416. Additionally, the shared memory 418 may be used to pass acknowledgment messages, error codes, and so on. For example, the sensors 404 may detect a person approaching the moving robotic arm. In this example, the non-real-time control 414 may inform the real-time control loop 416 of the approaching danger. The real-time control loop 416 may use this information to determine that an emergency shut-down is to be performed. The shared memory may be a RAM or cache, for example.

The real-time control loop 416 may be run in user mode or kernel mode. In user mode, the control real-time control loop 416 may be written in such a way that, during execution, the control real-time control loop 416 does not cede control of core 3. In examples of the claimed subject matter, application templates may be provided to developers, wherein the temples help the control real-time control loop 416 avoid yielding to other apps 420.

Figure 5:
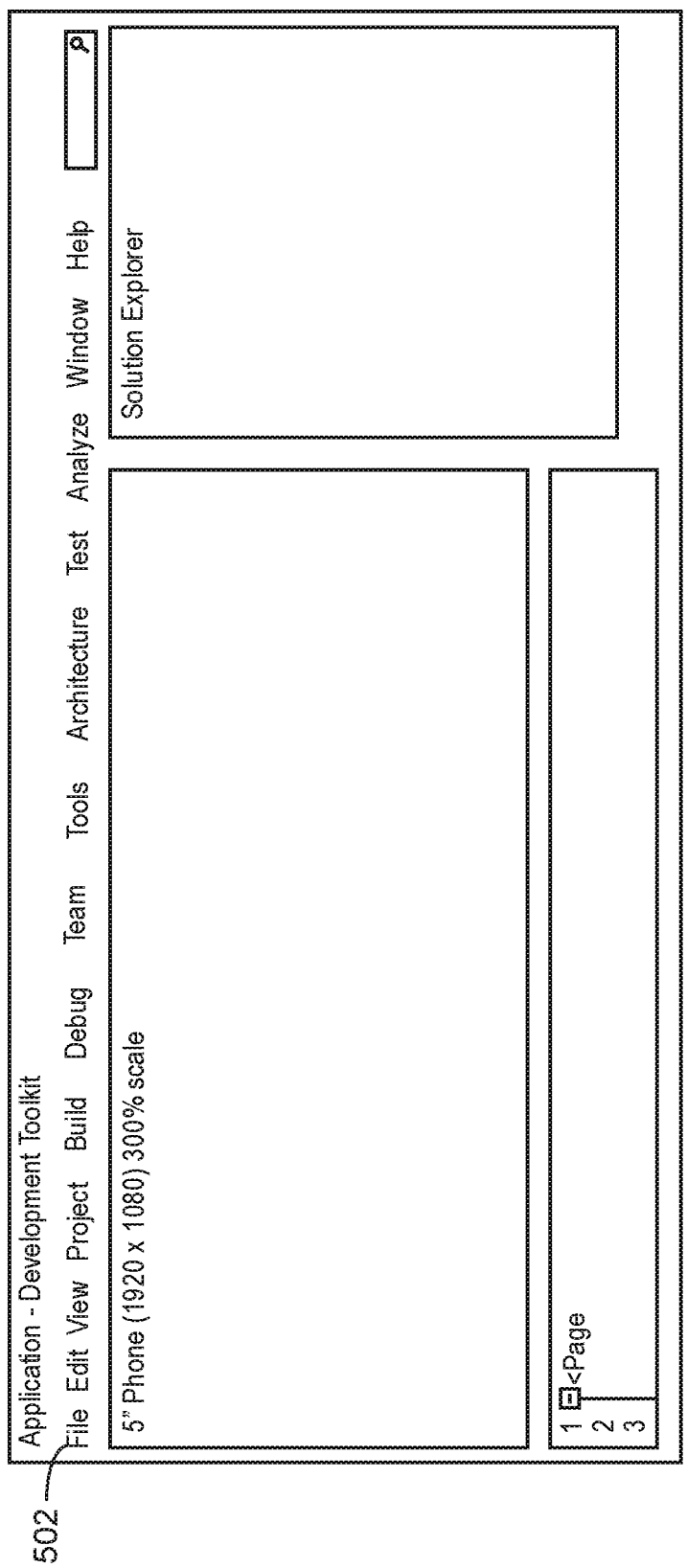
FIG. 5 is a block diagram of an example user interface of an example driver development tool.

FIG. 5 is a block diagram of a user interface 500 of an example driver development tool. The two-part applications described herein may be written using standard development tools, including kernel driver development tools. Kernel driver development tools are computer applications that enable developers to write, run, and deploy kernel mode drivers, kernel mode services, and kernel processes; and, provide libraries of templates and a user interface, such as user interface 500 consisting of common menus 502, simple buttons, drag-and-drop functions, and the like.

Even though kernel mode execution is more powerful than user mode execution, kernel mode software is typically more challenging to code and install. Accordingly, in example development toolkits, a library is provided with templates for both user mode and kernel mode software that is capable of communicating with each other. The user mode templates are pre-coded to create one thread, and to be set up in a way that prevents the thread from being interrupted. Existing development toolkits studio can fully support development of the two-part applications, without modification to the toolkits. In this way, the number of computer languages used to operate equipment in real-time may be expanded.

Figure 6:
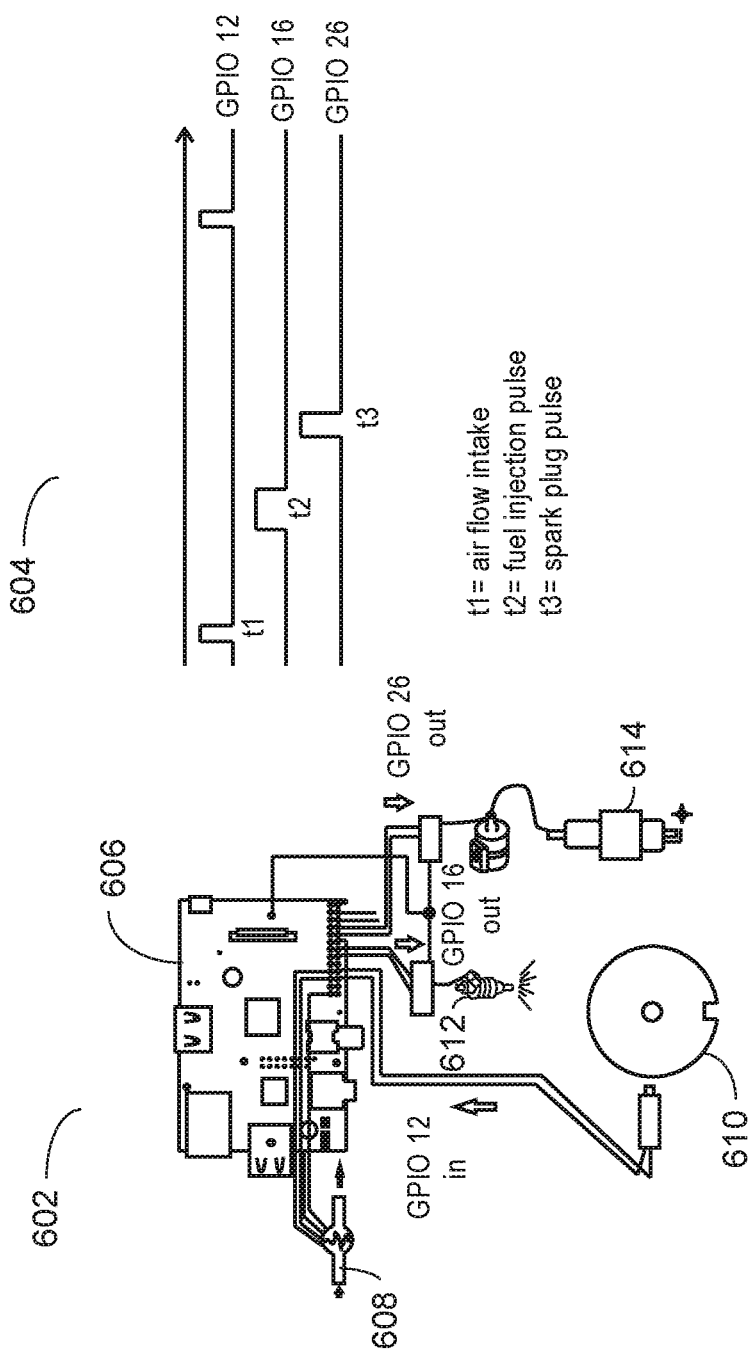
FIG. 6 is a diagram of an example piece of equipment and a timing diagram of operations performed to run the equipment.

FIG. 6 is a diagram of an example piece of equipment 602 and a timing diagram 604 of operations performed to run the equipment 602. In this example, the equipment 602 is an internal combustion engine, which includes electronic control unit (ECU) 606, air flow sensor 608, air pump 610, fuel injector 612, spark plug 614, and GPIO pins 12, 16, 26. The ECU 606 includes the core that executes the real-time control loop 416 for operating the engine. The real-time control loop 616 is executed in this example because the engine will not fire unless the air, fuel, and spark are provided at specific times. The ECU 606 receives information about the airflow from the air flow sensor 608 over GPIO 12, sends a signal to the fuel injector 612 to inject fuel into the engine over GPIO 16, and sends a signal to the spark plug 614 to fire over GPIO 26. The timing diagram 604 shows the timing of each pulse: t1, from the air flow sensor 608 over GPIO 12; t2, to the fuel injector 612 over GPIO 16, and t3, to the spark plug 614 over GPIO 26.

Figure 7:
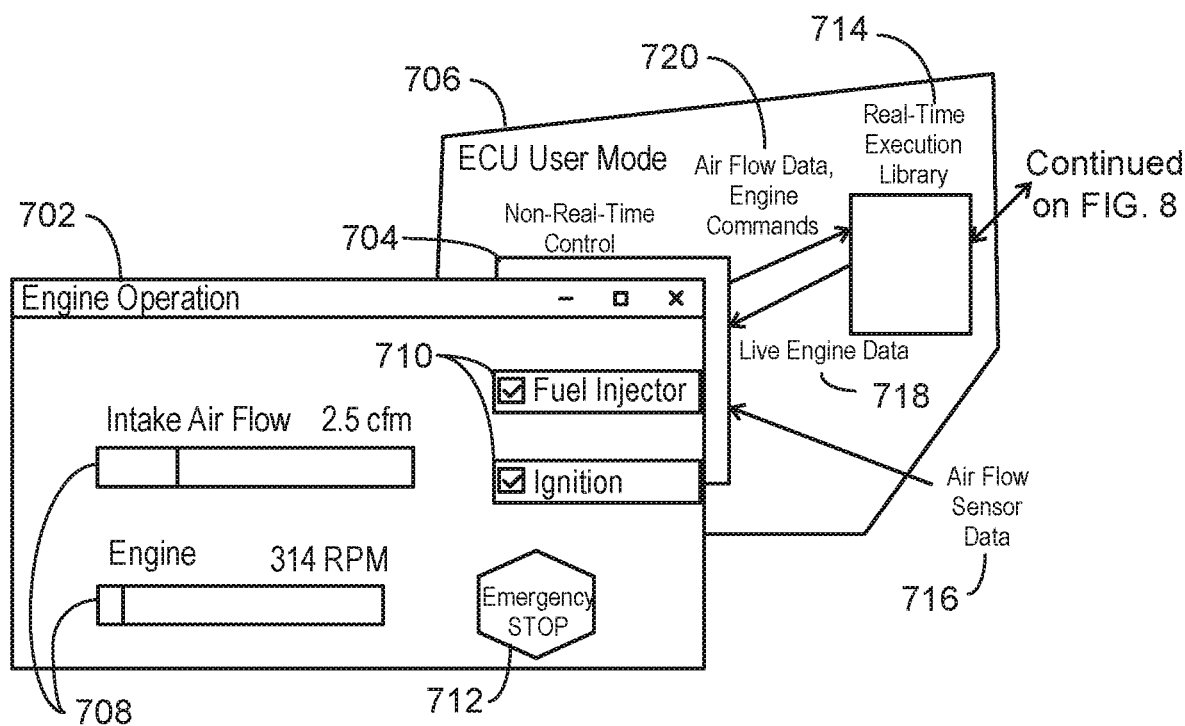
FIG. 7 is a block diagram of an abstraction of non-real-time execution of an application for operating the equipment.

FIG. 7 is a block diagram of an abstraction of non-real-time execution of an application for operating the equipment 602. Non-real-time execution may be useful for processes such as, presenting a user interface on an output device, e.g., a display. Accordingly, the user interface 702 for "Engine Operation," is provided by a non-real-time control 704 executing in user mode 706. The user interface 702 presents data fields 708 such as, an "Intake Air Flow" rate in cubic feet per minute (cfm), and revolutions per minute (RPM) of the engine. The user interface 702 also provides checkboxes 710 that allow the enabling and disabling of the "Fuel Injector," and the "Ignition." Additionally, the user interface 702 includes an "Emergency Stop" button 712, which enables stopping the engine operation in real-time.

The non-real-time control 704 makes calls to, and receives calls from modules of a real-time execution library 714. The modules of the real-time execution library 714 are configured to provide the ability for applications to execute both real-time and non-real-time operations on a non-real-time operating system. Additionally, the real-time execution library 714 enables the application developer to separate the application into a non-real-time control 704 and a real-time execution loop. In this example, the non-real-time control 704 receives air flow sensor data 716 from the air flow sensor 608. Additionally, the non-real-time control 704 makes a call to the real-time execution library 714 to retrieve live engine data 718, i.e., revolutions per minute, form the shared memory. The non-real-time control uses the data 716, 718 for presentation within the user interface 702 in data fields 708. Further, to assist the execution of real-time control loop, the non-real-time control 704 sends the air flow data and engine commands 720 to the shared memory using a call to a module of the real-time execution library 714. The engine commands may include a command such as, emergency stop, if the emergency stop button 712 is clicked.

Figure 8:
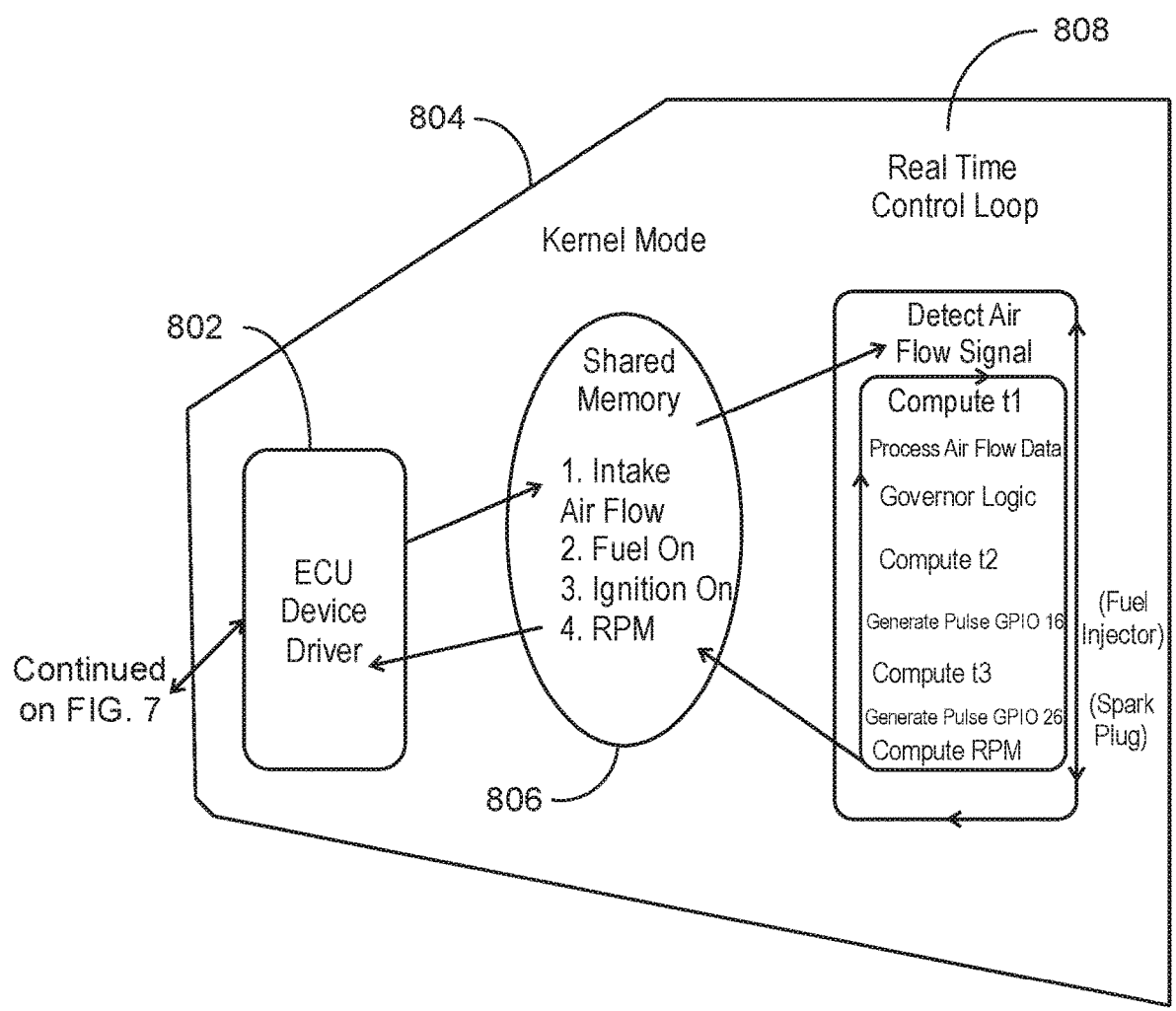
FIG. 8 is a block diagram of an abstraction of real-time execution in coordination with the non-real-time execution.

FIG. 8 is a block diagram of an abstraction of real-time execution in coordination with the non-real-time execution described with respect to FIG. 7. The modules of the real-time execution library 714 invoke routines of an ECU device driver 802 operating in kernel mode. The ECU device driver 802 provides access to, and control of, the ECU 602. The routines invoked in the ECU device driver 802 pass information for the real-time control loop 808 to shared memory 806. Additionally, the real-time control loop 808 passes information for the non-real-time control 704 to the shared memory 806. In this example, the shared memory includes the following information: 1) rate of intake air flow, 2) fuel on indicator, 3) ignition on indicator, and 4) RPM. As shown in user interface 702, the fuel and ignition are both on. Accordingly, both the fuel and ignition indicators are set to on.

The real-time control loop 808 may begin when the application 212 is launched. In one example of the claimed subject matter, the application 212 may be launched automatically when the ECU 606 is re-booted. The real-time control loop 808 begins by checking if the air intake sensor 608 has provided a signal, and does not proceed until the signal is received. Once the signal is received, the real-time control loop computes the RPM, and if the RPM is greater than 0 (or a specified threshold), then the real-time code in the real-time control loop declares that the engine has started rotating. Additionally, the real-time control loop 808 computes the ignition timing, and reads air pressure and air flow from shared memory 804, written to by the non-real time control 704. Because intake air pressure and temperature change slowly, compared to the fast running real-time code, there are no synchronization problems between the real-time control loop 808 and the data provided by the non-real-time control 704. Governing logic for operating the engine may then proceed. A computation is performed to determine the timing of pulse t2, which is output over GPIO 16, and fuel is injected into the engine. Further, a computation is performed to determine the timing of pulse t3. The pulse t3 is then output over GPIO 26, the spark plug 612 fires, and the fuel and air ignite. The RPM are computed again, and stored in the shared memory 806. Though not shown here, the real-time control loop 808 may also include instructions for performing an emergency stop if the shared memory 806 contains the emergency stop command or any other suitable number of instructions to be performed in real-time.

Figure 9:
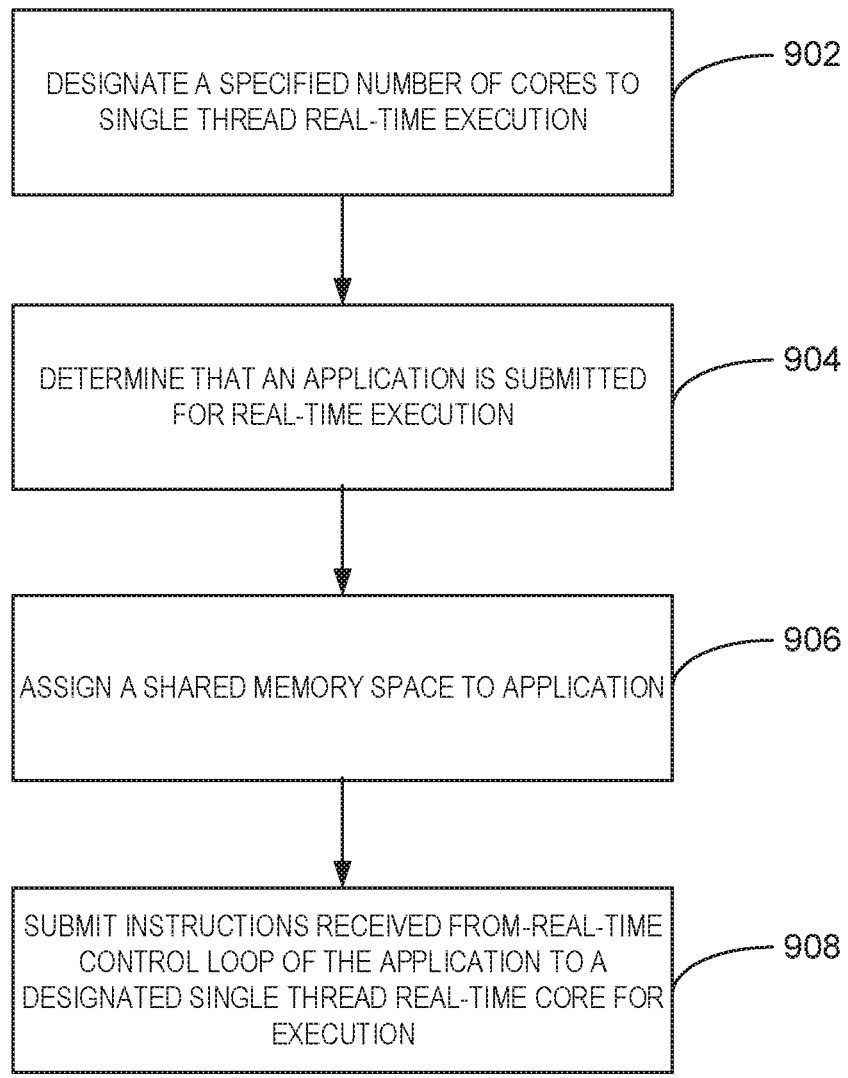
FIG. 9 is a process flow diagram of a method for real-time execution in a non-real-time operating system.

FIG. 9 is a process flow diagram of a method 900 for real-time execution in a non-real-time operating system. The method is performed by the non-real-time operating system, and begins at block 902, where the non-real-time operating system designates a specified number of cores for single thread, real-time execution. The processor cores designated to run real-time threads are chosen based on platform properties. One example of a property is the number assigned to the cores for identification. Typically, the number starts at zero, and increases by one for each core. In this typical configuration, it is likely that lower numbered cores are in higher demand than the higher numbered cores. In fact, it is not unusual for an operating system in a multi-core environment to reserve core number zero to itself exclusively. Thus, the core in least demand, i.e., the highest-numbered core is chosen to be a designated core. For example, if the platform is a quad core platform (cores numbered zero to three), then select core number three is designated for real time processing. For a six-core platform (cores numbered zero to five), then core five is chosen. When multiple cores are designated for real-time processing, the next lowest cores may also be designated for real-time processing.

In some cases, the platform for the non-real-time operating system may be an atypical multi-core environment. For example, there may be specific device drivers to run on this platform, instead of those provided by the operating system, then information about specific drivers may be used to choose the cores designated for real-time processing.

For example, one atypical platform may include an attached liquid crystal display (LCD) panel with a touch screen. However, instead of the operating system providing the driver for the touch screen, a vendor-supplied driver is used. In such a platform, specifications for the vendor's driver may express a preference to run on a specific core based on the size of the platform. For example, the touch driver specifications may state that the fourth core (core number three) in a quad core platform is preferred. Accordingly, the non-real-time operating system may designate core number two for real-time processing. Regardless of the platform or driver preferences, the present techniques are processor-core-agnostic and can be adopted to various multi-core platforms. As described with respect to FIG. 3, dedicating cores to single thread execution means that only one executing application 212 has access to a designated core at any one time. If an application makes a request of the operating system to run on the dedicate core, the operating system denies access. In this way, the non-real-time operating system provides real-time control.

At block 904, the non-real-time operating system determines that an application has been submitted for real-time execution. As described previously, the application includes two parts: non-real-time control 414 and a real-time control loop 416. At block 906, the non-real-time operating system assigns a shared memory 418 to the application 212. The shared memory 418 is used by the non-real-time control 414 and the real-time control loop 416 to communicate with each other.

At block 908, the non-real-time operating system submits instructions received from the real-time control loop 808 to the designated single thread real-time core for execution. As stated previously, there are several processor cores and each core executes its own set of instructions. There is no switching between real-time instruction and non-real time instructions. They are the same processor instructions.

Typically, an operating system is free to run any application on any processor core. So, if there are four processor cores on a platform, for example, up to four applications can be running concurrently. If there are six applications, then any four can run concurrently, and two are suspended. The operating system includes a scheduler that shuffles, preempts and relocate any non-real-time application to any non-real-time processor core, as it decides to do in a friendly way to give any of the six applications a chance to run a bit every time.

However, in examples of the claimed subject matter, at least one processor core is dedicated to real-time processing. So, if there are four processor cores, as in the above example, only three applications can be running concurrently, since one processor core is reserved for the real-time thread. The scheduler still shuffles, pre-empts, and relocates applications, but not to the processor core dedicated to real-time execution. Since there is no contention on the real-time processor core, the real-time thread running is not pre-empted nor interrupted by the non-real-time operating system.

FIG. 10 is a block diagram of an example of a computing system for real-time execution in a non-real-time operating system. The example system 1000 includes a computing device 1002. The computing device 1002 includes a processing unit 1004, a system memory 1006, and a system bus 1008. In some examples, the computing device 1002 can be a gaming console, a personal computer (PC), an accessory console, a gaming controller, among other computing devices. In some examples, the computing device 1002 can be a node in a cloud network.

The system bus 1008 connects system components including, but not limited to, the system memory 1006 to the processing unit 1004. The processing unit 1004 can be any of various available processors. Dual microprocessors and other multiprocessor architectures also can be employed as the processing unit 1004. In some embodiments, the processing unit 1004 can include any number of cores designated to executing real-time instructions or non-real time instructions.

The system bus 1008 can be any of several types of bus structure, including the memory bus or memory controller, a peripheral bus or external bus, and a local bus using any variety of available bus architectures known to those of ordinary skill in the art. The system memory 1006 includes computer-readable storage media that includes volatile memory 1010 and nonvolatile memory 1012.

The basic input/output system (BIOS), containing the basic routines to transfer information between elements within the computer 1002, such as during start-up, is stored in nonvolatile memory 1012. By way of illustration, and not limitation, nonvolatile memory 1012 can include read-only memory (ROM), programmable ROM (PROM), electrically programmable ROM (EPROM), electrically erasable programmable ROM (EEPROM), or flash memory.

Volatile memory 1010 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 1002 also includes other computer-readable media, such as removable/non-removable, volatile/nonvolatile computer storage media. FIG. 10 shows, for example a disk storage 1014. Disk storage 1014 includes, but is not limited to, devices like a magnetic disk drive, floppy disk drive, tape drive, Jaz drive, Zip drive, LS-210 drive, flash memory card, or memory stick.

In addition, disk storage 1014 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1014 to the system bus 1008, a removable or non-removable interface is typically used such as interface 1016.

It is to be appreciated that FIG. 10 describes software that acts as an intermediary between users and the basic computer resources described in the suitable operating environment 1000. Such software includes a non-real-time operating system 1018. The non-real-time operating system 1018, which can be stored on disk storage 1014, acts to control and allocate resources of the computer 1002. For example, the non-real-time operating system 1018 can determine if instructions are to be executed by cores of the processing unit 1004 dedicated to real-time instructions or cores of the processing unit 1004 dedicated to non-real-time instructions. In some embodiments, the non-real-time operating system 1018 can identify a processing unit dedicated to a single thread real-time execution environment and determine that an application is submitted for real-time execution. The non-real-time operating system 1018 can also assign shared memory space to the application and submit instructions received from a real-time control loop of the application to the identified processing unit.

System applications 1020 take advantage of the management of resources by operating system 1018 through program modules 1022 and program data 1024 stored either in system memory 1006 or on disk storage 1014. It is to be appreciated that the disclosed subject matter can be implemented with various operating systems or combinations of operating systems that include at least one non-real-time operating system.

A user enters commands or information into the computer 1002 through input devices 1026. Input devices 1026 include, but are not limited to, a pointing device, such as, a mouse, trackball, stylus, and the like, a keyboard, a microphone, a joystick, a satellite dish, a scanner, a TV tuner card, a digital camera, a digital video camera, a web camera, and the like. In some examples, an input device can include Natural User Interface (NUI) devices. NUI refers to any interface technology that enables a user to interact with a device in a "natural" manner, free from artificial constraints imposed by input devices such as mice, keyboards, remote controls, and the like. In some examples, NUI devices include devices relying on speech recognition, touch and stylus recognition, gesture recognition both on screen and adjacent to the screen, air gestures, head and eye tracking, voice and speech, vision, touch, gestures, and machine intelligence. For example, NUI devices can include touch sensitive displays, voice and speech recognition, intention and goal understanding, and motion gesture detection using depth cameras such as stereoscopic camera systems, infrared camera systems, RGB camera systems and combinations of these. NUI devices can also include motion gesture detection using accelerometers or gyroscopes, facial recognition, three-dimensional (3D) displays, head, eye, and gaze tracking, immersive augmented reality and virtual reality systems, all of which provide a more natural interface. NUI devices can also include technologies for sensing brain activity using electric field sensing electrodes. For example, a NUI device may use Electroencephalography (EEG) and related methods to detect electrical activity of the brain. The input devices 1026 connect to the processing unit 1004 through the system bus 1008 via interface ports 1028. Interface ports 1028 include, for example, a serial port, a parallel port, a game port, and a universal serial bus (USB).

Output devices 1030 use some of the same type of ports as input devices 1026. Thus, for example, a USB port may be used to provide input to the computer 1002 and to output information from computer 1002 to an output device 1030.

Output adapter 1032 is provided to illustrate that there are some output devices 1030 like monitors, speakers, and printers, among other output devices 1030, which are accessible via adapters. The output adapters 1032 include, by way of illustration and not limitation, video and sound cards that provide a means of connection between the output device 1030 and the system bus 1008. It can be noted that other devices and systems of devices provide both input and output capabilities such as remote computing devices 1034.

The computer 1002 can be a server hosting various software applications in a networked environment using logical connections to one or more remote computers, such as remote computing devices 1034. The remote computing devices 1034 may be client systems configured with web browsers, PC applications, mobile phone applications, and the like. The remote computing devices 1034 can be a personal computer, a server, a router, a network PC, a workstation, a microprocessor based appliance, a mobile phone, a peer device or other common network node and the like, and typically includes many or all of the elements described relative to the computer 1002.

Remote computing devices 1034 can be logically connected to the computer 1002 through a network interface 1036 and then connected via a communication connection 1038, which may be wireless. Network interface 1036 encompasses wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection 1038 refers to the hardware/software employed to connect the network interface 1036 to the bus 1008. While communication connection 1038 is shown for illustrative clarity inside computer 1002, it can also be external to the computer 1002. The hardware/software for connection to the network interface 1036 may include, for exemplary purposes, internal and external technologies such as, mobile phone switches, modems including regular telephone grade modems, cable modems and DSL modems, ISDN adapters, and Ethernet cards.

The computer 1002 can further include a radio 1040. For example, the radio 1040 can be a wireless local area network radio that may operate one or more wireless bands. For example, the radio 1040 can operate on the industrial, scientific, and medical (ISM) radio band at 2.4 GHz or 5 GHz. In some examples, the radio 1040 can operate on any suitable radio band at any radio frequency.

The computer 1002 includes one or more modules 1022, such as a real-time execution library 1042. The real-time execution library 1042 provides developers with templates of real-time and non-real-time execution applications for operating equipment.

It is to be understood that the block diagram of FIG. 10 is not intended to indicate that the computing system 1002 is to include all of the components shown in FIG. 10. Rather, the computing system 1002 can include fewer or additional components not illustrated in FIG. 10 (e.g., additional applications, additional modules, additional memory devices, additional network interfaces, etc.). Furthermore, any of the functionalities of the non-real-time operating system 1018 may be partially, or entirely, implemented in hardware and/or in the processor 1004. For example, the functionality may be implemented with an application specific integrated circuit, in logic implemented in the processor 1004, or in any other device.

Figure 11:
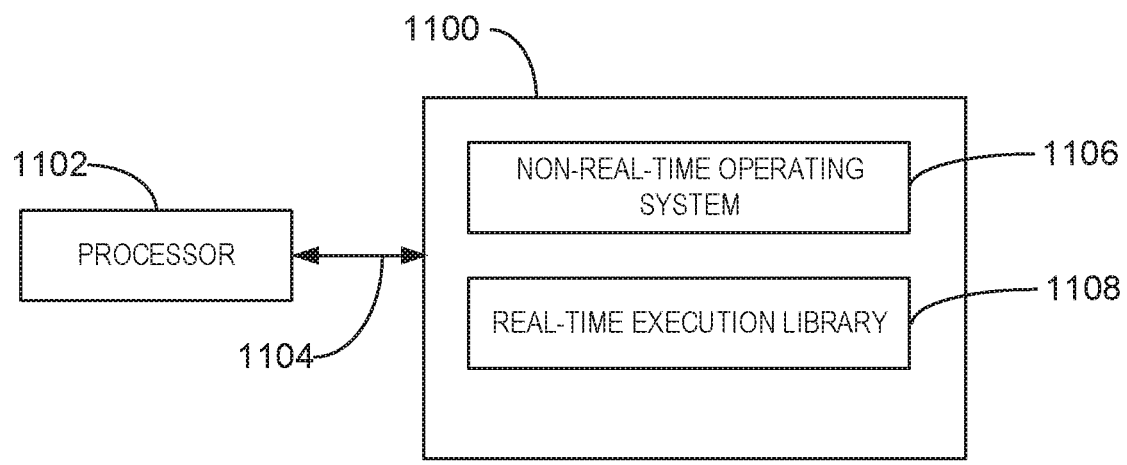
FIG. 11 is a block diagram of an example computer-readable storage media.

FIG. 11 is a block diagram of an example computer-readable storage media for real-time execution in a non-real-time operating system. The tangible, computer-readable storage media 1100 may be accessed by a processor 1102 over a computer bus 1104. Furthermore, the tangible, computer-readable storage media 1100 may include code to direct the processor 1102 to perform the steps of the current method.

The various software components discussed herein may be stored on the tangible, computer-readable storage media 1100, as indicated in FIG. 11. For example, the tangible computer-readable storage media 1100 can include a non-real-time operating system 1106, and a real-time execution library 1108, configured to enable real-time execution in a non-real-time operating system. For example, the non-real-time operating system 1106 can identify a processing unit dedicated to a single thread real-time execution environment and determine that an application is submitted for real-time execution. The non-real-time operating system 1106 can also assign shared memory space to the application and submit instructions received from a real-time control loop of the application to the identified processing unit.

It is to be understood that any number of additional software components not shown in FIG. 11 may be included within the tangible, computer-readable storage media 1100, depending on the specific application. Further, the non-real-time operating system 1106 can be implemented by the processor 1102 residing in a server of a distributed network. Accordingly, a remote computing device may request data from the processor 1102 and the non-real-time operating system 1106.

Example 1

An embodiment described herein includes a system for real-time execution on a non-real-time operating system. The system includes a processor and a storage device. The storage device stores instructions that, in response to execution by the processor, cause the processor to identify a processing unit for a single thread real-time execution environment. The instructions also cause the processor to determine that an application is submitted for real-time execution. The instructions additionally cause the processor to assign a shared memory space to the application. Further, the instructions cause the processor to submit real-time instructions received from a real-time control loop of the application to the identified processing unit. Alternatively, or in addition, the instructions cause the processor to identify a specified number of processing units for a single thread real-time execution environment, and submit the real-time instructions received from the real-time control loop of the application to one of the identified processing units. Alternatively, or in addition, the identified processing unit provides, in real-time, a command for an actuator in response to executing one of the real-time instructions. Alternatively, or in addition, a piece of automated equipment includes the identified processing unit. Alternatively, or in addition, the piece of automated equipment includes an actuator. Alternatively, or in addition, the actuator responds to the command in real-time. Alternatively, or in addition, the application includes the real-time control loop and a non-real-time control. The non-real-time control performs processes for the equipment without real-time requirements. Alternatively, or in addition, the real-time control loop and a non-real-time control communicate via a shared memory space associated with the processor.

Example 2

Another embodiment described herein includes a method for real-time execution in a non-real-time operating system. The method includes identifying a first core of a first processing unit for single thread real-time execution. The method includes identifying a second core of a second processing unit for single thread real-time execution. The first core and the second core are identified based on whether identification numbers for the first core and the second core are highest-numbered cores in comparison to other cores of the first processor and the second processor. The method also includes determining that an application is submitted for real-time execution. The method additionally includes assigning a shared memory space to the application. Further, the method includes submitting instructions received from a real-time control loop of the application to the identified first core of the first processing unit. Alternatively, or in addition, the method can include identifying a specified number of cores associated with the first processing unit and the second processing unit for a single thread real-time execution environment, and submitting the real-time instructions received from the real-time control loop of the application to one of the identified processing units. Alternatively, or in addition, the method can include submitting non-real-time instructions received from a non-real-time control of the application to the identified non-real-time processing unit. Alternatively, or in addition, a piece of automated equipment includes the identified processing unit and the identified non-real-time processing unit. Alternatively, or in addition, the piece of automated equipment includes the actuator. Alternatively, or in addition, the actuator responds to the command in real-time. Alternatively, or in addition, the application includes the real-time control loop and a non-real-time control, wherein the non-real-time control performs processes for the equipment without real-time requirements. Alternatively, or in addition, the real-time control loop and the non-real-time control pass information via a shared memory space associated with the processor.

Example 3

In yet another embodiment described herein, one or more computer-readable media can include instructions that, based at least on execution by a plurality of processors, cause the processors to perform real-time execution in a non-real-time operating system. The instructions also cause the processors to identify a specified number of cores of the processors for a single thread real-time execution environment. The instructions also cause the processor to determine that an application is submitted for real-time execution. Further, the instructions cause the processor to assign a shared memory space to the application. The instructions additionally cause the processor to submit real-time instructions received from the real-time control loop of the application to one of the identified processing units. Alternatively, or in addition, the application includes the real-time control loop and a non-real-time control. The non-real-time control performs processes for the equipment without real-time requirements. The real-time control loop and the non-real-time control communicate via the shared memory space.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system for real-time execution in a non-real-time operating system, comprising:
   a processor comprising a plurality of cores; and
   a storage device that stores instructions that, in response to execution by the processor, cause the processor to:
   designate one of the cores for a single thread real-time execution environment based on a suitability of the core for real-time use such that a single real-time control loop of an executing first application has exclusive control of the designated core, wherein the processor is to deny access to a second application that makes a request of the non-real-time operating system to run on the designated core;
   determine that the first application is submitted for real-time execution;
   assign a shared memory space to the first application; and
   submit real-time instructions received from the real-time control loop of the first application to the one core, the real-time instructions to be sent to the one core in response to detecting sensor data that indicates an operating condition based on a distance between a robot and a user, the real-time instructions to halt at least one actuator operated by the robot.

2. The system of claim 1, wherein the instructions cause the processor to:
   identify a specified number of cores for the single thread real-time execution environment; and
   submit the real-time instructions received from the real-time control loop of the first application to one of the identified cores.

3. The system of claim 1, wherein the one core provides, in real-time, a command for an actuator in response to executing one of the real-time instructions.

4. The system of claim 1, wherein a piece of automated equipment comprises the one core.

5. The system of claim 4, wherein the piece of automated equipment comprises an actuator.

6. The system of claim 3, wherein a piece of automated equipment comprises the actuator, and wherein the actuator responds to the command in real-time.

7. The system of claim 1, wherein the one core for the single thread real-time execution environment is identified based on whether a device driver of the system executes on a highest-numbered core of the system, wherein the highest-numbered core is highest-numbered in comparison to other cores of the system.

8. The system of claim 1, wherein the first application comprises the real-time control loop and a non-real-time control, wherein the non-real-time control performs processes for an equipment without real-time requirements.

9. The system of claim 1, wherein the real-time control loop and a non-real-time control communicate via a shared memory space associated with the processor and an additional processor comprising a plurality of cores.

10. One or more computer-readable storage devices for real-time execution comprising a plurality of instructions that, based at least on execution by a plurality of processors, cause the processors to:
    designate a specified number of cores for a single thread real-time execution environment based on a suitability of the designated cores for real-time use such that a single real-time control loop of an executing first application has exclusive control of the designated cores, wherein the processor is to deny access to a second application that makes a request of a non-real-time operating system to run on the designated cores, the designated cores being associated with the processors;
    determine that the first application is submitted for real-time execution;
    assign a shared memory space to the first application; and
    submit real-time instructions received from the real-time control loop of the first application to one of the designated cores, the real-time instructions to be sent to the designated cores in response to detecting sensor data that indicates an operating condition based on a distance between a robot and a user, the real-time instructions to halt at least one actuator operated by the robot.

11. The system of claim 1, wherein the at least one actuator comprises a solenoid or a shape-memory alloy.

12. The system of claim 1, wherein the first application is separated into a non-real-time control and the single real-time control loop, wherein the non-real-time control is to make calls to and receive calls from a real-time execution library.

13. A method for real-time execution using a non-real-time operating system, comprising:
    designating a first core of a first processor for a single thread real-time execution environment based on a suitability of the first core for real-time use such that a single real-time control loop of an executing first application has exclusive control of the designated cores, wherein the first processor is to deny access to a second application that makes a request of the non-real-time operating system to run on the designated cores;
    identifying a second core of a second processor for non-real-time execution, wherein the first core and the second core are identified based on whether identification numbers for the first core and the second core are highest-numbered cores in comparison to other cores of the first processor and the second processor, wherein the first core is a highest numbered core of the first processor and the second core is not a highest numbered core of the second processor;
    determining that the first application is submitted for real-time execution;
    assigning a shared memory space to the first application; and
    submitting real-time instructions received from the real-time control loop of the first application to the first core, the real-time instructions to be sent to the first core in response to detecting sensor data that indicates an operating condition based on a distance between a robot and a user, wherein the first core provides, in real-time, a command for an actuator in response to executing one of the real-time instructions.

14. The method of claim 13, comprising:
    identifying a specified number of cores for the single thread real-time execution environment, the specified number of cores being associated with the first processor and the second processor; and
    submitting the real-time instructions received from the real-time control loop of the first application to one of the identified cores.

15. The method of claim 13, comprising submitting non-real-time instructions received from a non-real-time control of the first application to the second core.

16. The method of claim 13, wherein a piece of automated equipment comprises the first core and the second core.

17. The method of claim 16, wherein the piece of automated equipment comprises the actuator.

18. The method of claim 15, wherein the actuator responds to the command in real-time.

19. The method of claim 13, wherein the first application comprises the real-time control loop and a non-real-time control, wherein the non-real-time control performs processes for an equipment without real-time requirements.

20. The method of claim 13, wherein the real-time control loop and a non-real-time control pass information via a shared memory space associated with the first processor.

21. The one or more computer-readable storage devices of claim 10, wherein the first application comprises the real-time control loop and a non-real-time control, wherein the non-real-time control performs processes for an equipment without real-time requirements, and wherein the real-time control loop and the non-real-time control communicate via the shared memory space.

* * * * *